(12) United States Patent
Zhu et al.

(10) Patent No.: US 9,897,741 B2
(45) Date of Patent: Feb. 20, 2018

(54) LIGHT GUIDE STRUCTURE, BACKLIGHT MODULE, AND DISPLAY DEVICE

(71) Applicant: BOE TECHNOLOGY GROUP CO., LTD., Beijing (CN)

(72) Inventors: Ming Zhu, Beijing (CN); Teruaki Suzuki, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/101,250

(22) PCT Filed: Nov. 23, 2015

(86) PCT No.: PCT/CN2015/095279
§ 371 (c)(1),
(2) Date: Jun. 2, 2016

(87) PCT Pub. No.: WO2016/201887
PCT Pub. Date: Dec. 22, 2016

(65) Prior Publication Data
US 2017/0131457 A1    May 11, 2017

(30) Foreign Application Priority Data

Jun. 19, 2015  (CN) .......................... 2015 1 0346533

(51) Int. Cl.
*F21V 9/14*    (2006.01)
*F21V 8/00*    (2006.01)

(52) U.S. Cl.
CPC ........... *G02B 6/0053* (2013.01); *G02B 6/005* (2013.01); *G02B 6/0055* (2013.01); *G02B 6/0056* (2013.01); *G02B 6/0065* (2013.01)

(58) Field of Classification Search
CPC .... G02B 26/02; G02B 6/0043; G02B 6/0055; G02B 6/005; G02B 6/0051; G02B 6/0056;
(Continued)

(56) References Cited

U.S. PATENT DOCUMENTS 6,520,650 B2 *  2/2003  Fraizer .................. C23C 16/401
                                                       359/514
7,750,995 B2     7/2010  Kim
(Continued)

FOREIGN PATENT DOCUMENTS

CN    2588407 Y    11/2003
CN    1508595 A     6/2004
(Continued)

OTHER PUBLICATIONS

International Search Report of PCT/CN2015/095279 in Chinese, dated Mar. 31, 2016 with English translation.
(Continued)

*Primary Examiner* — Thien M Le
(74) *Attorney, Agent, or Firm* — Collard & Roe, P.C.

(57) ABSTRACT

A light guide structure (10), a backlight module (20) and a display device are disclosed, which can reduce loss of light in travelling and increase utilization rate of light. The light guide structure (10) including: a light guide plate (1) including a light-exiting surface (11) and a reflection surface (12) that are opposite to each other and a side surface (13) connecting the light-exiting surface (11) with the reflection surface (12), a material of the light guide plate (1) being an isotropic material; a reflection type brightness enhancement film (2) that is disposed at a side where the light-exiting surface (11) of the light guide plate (1) is located; a quarter wavelength plate (3) that is disposed between the light-exiting surface (11) of the light guide plate (1) and the
(Continued)

reflection type brightness enhancement film (2), with an angle of 45 degree existing between a slow axis of the quarter wavelength plate (3) and a transmission axis of the reflection type brightness enhancement film (2); and a reflection film (4) that is disposed at a side where the reflection surface (12) of the light guide plate (1) is located.

20 Claims, 2 Drawing Sheets

(58) Field of Classification Search
CPC .. G02B 26/023; G02B 6/0018; G02B 6/0035; G02B 6/0073; G02B 6/0076; G02B 6/0078
USPC .......................................................... 362/19
See application file for complete search history.

(56) References Cited

U.S. PATENT DOCUMENTS

| | | | |
|---|---|---|---|
| 8,928,843 | B2 | 1/2015 | Harada |
| 2004/0105055 | A1 | 6/2004 | Yu et al. |
| 2006/0290847 | A1 | 12/2006 | Kim |
| 2008/0062500 | A1* | 3/2008 | Hagood, IV ......... G02B 6/0043 359/230 |
| 2011/0157679 | A1* | 6/2011 | Fike ..................... B32B 37/003 359/290 |
| 2012/0287677 | A1* | 11/2012 | Wheatley ............. G02B 6/0051 362/627 |
| 2013/0050979 | A1* | 2/2013 | Van De Ven ............. F21V 3/04 362/84 |
| 2014/0232728 | A1* | 8/2014 | Eakin .................. H01L 51/5281 345/501 |
| 2014/0267331 | A1* | 9/2014 | Villarreal ............... G02B 26/02 345/531 |
| 2016/0054508 | A1* | 2/2016 | Hirayama ............ G02B 6/0038 349/65 |
| 2016/0178834 | A1* | 6/2016 | Yu ........................ G02B 6/0076 362/19 |

FOREIGN PATENT DOCUMENTS

| | | |
|---|---|---|
| CN | 1885121 A | 12/2006 |
| CN | 1885122 A | 12/2006 |
| CN | 101097348 A | 1/2008 |
| CN | 201145795 Y | 11/2008 |
| CN | 104914624 A | 9/2015 |

OTHER PUBLICATIONS

Notice of Transmittal of the International Search Report of PCT/CN2015/095279 in Chinese, dated Mar. 31, 2016.

Written Opinion of the International Searching Authority of PCT/CN2015/095279 in Chinese, dated Mar. 31, 2016 with English translation.

Chinese Office Action in Chinese Application No. 201510346533.X, dated Jul. 27, 2017 with English translation.

* cited by examiner

LIGHT GUIDE STRUCTURE, BACKLIGHT MODULE, AND DISPLAY DEVICE

CROSS REFERENCE TO RELATED APPLICATIONS

This application is the National Stage of PCT/CN2015/095279 filed on Nov. 23, 2015, which claims priority under 35 U.S.C. § 119 of Chinese Application No. 201510346533.X filed on Jun. 19, 2015, the disclosure of which is incorporated by reference.

TECHNICAL FIELD

Embodiments of the present disclosure relate to a light guide structure, a backlight module, and a display device.

BACKGROUND

Liquid crystal displays (LCDs) have advantages such as low radiation, small size, and low power consumption, and are gradually taking place of traditional cathode ray tube displays (CRTs) and have been widely used in products such as laptops, personal digital assistants (PDA), flat TVs and mobile phones.

A liquid crystal display includes a display panel and a backlight module. A backlight module is a module providing a light source for a liquid crystal display product, and is usually disposed below a display panel to provide light that is uniformly diffused and of a definite brightness to the display panel. According to different voltages of pixel electrodes on the display panel, color images with different brightness, of different colors, and in different gray scales can be formed.

A backlight module with a light source disposed on a side face is an edge lighting type backlight module. In an edge lighting type backlight module, light generated by a light source (linear light source) enters a light guide plate, the linear light source is converted to a surface light source by the light guide plate and then is emitted out, then passes through a lower polarizer and is converted into a linear polarized light and reaches the display panel. However, in a known edge lighting type backlight module, the lower polarizer only allows linear polarized light to pass through, and light can not pass through the lower polarizer cannot be used.

SUMMARY

Embodiments of the disclosure provide a light guide structure, a backlight module and a display device, to reduce loss of light in travelling and increase utilization rate of light.

At least one embodiment of the disclosure provides a light guide structure comprising: a light guide plate, comprising a light-exiting surface and a reflection surface that are opposite to each other and a side surface connecting the light-exiting surface with the reflection surface, and a material of the light guide plate being an isotropic material; a reflection type brightness enhancement film, being disposed at a side where the light-exiting surface of the light guide plate is located; a quarter wavelength plate, being disposed between the light-exiting surface of the light guide plate and the reflection type brightness enhancement film, with an angle of 45 degree existing between a slow axis of the quarter wavelength plate and a transmission axis of the reflection type brightness enhancement film; and a reflection film, being disposed at a side where the reflection surface of the light guide plate is located.

In some examples, the light guide structure further comprises a lower polarizer disposed above the reflection type brightness enhancement film, wherein a transmission axis of the lower polarizer is parallel to the transmission axis of the reflection type brightness enhancement film.

In some examples, the lower polarizer is an absorption type polarizer.

In some examples, the light guide plate is a glass light guide plate.

In some examples, the light guide plate is a light guide plate of hard polymethyl methacrylate.

In some examples, the reflection film is an enhancement mirror reflection film.

In some examples, a thickness of the reflection film is in a range of 2 µm-5 µm.

Another embodiment of the disclosure provides a backlight module comprising any one of the above-mentioned light guide structures and a light source, wherein the light source is disposed at the side surface of the light guide plate.

Another embodiment of the disclosure provides a display device comprising a display panel and any one of the above-mentioned backlight module, wherein the backlight module is disposed at a non-display side of the display panel.

In some examples, the display device further comprises an upper polarizer, wherein the upper polarizer is disposed at a display side of the display panel, and a transmission axis of the upper polarizer is parallel or perpendicular to the transmission axis of the reflection type brightness enhancement film.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The inventor has noted that, the known light guide structure of an edge lighting type backlight module will lose a portion of light emitted by a light source, and light emitted by the light source will be wasted greatly in travelling, and lower utilization rate of light will be occurred.

Figure 1:
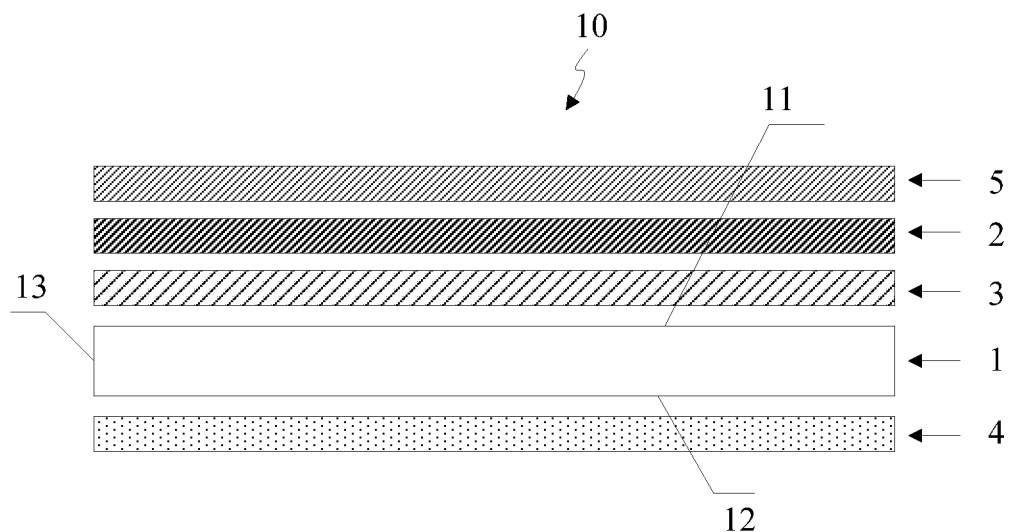
FIG. 1 is a structure schematic diagram illustrating a light guide structure provided by an embodiment of the disclosure.

As illustrated in FIG. 1, at least one embodiment of the present disclosure provides a light guide structure 10 including: a light guide plate 1, including a light-exiting surface 11 and a reflection surface 12 that are opposite to each other and a side surface 13 connecting the light-exiting surface 11 with the reflection surface 12, and a material of the light guide plate 1 being an isotropic material; a reflection type brightness enhancement film 2, being disposed at a side where the light-exiting surface 11 of the light guide plate 1 is located; a quarter wavelength plate 3, being disposed between the light-exiting surface 11 of the light guide plate 1 and the reflection type brightness enhancement film 2, with an angle of 45 degree existing between a slow axis of the quarter wavelength plate 3 and a transmission axis of the reflection type brightness enhancement film 2; and a reflection film 4, being disposed at a side where the reflection surface 12 of the light guide plate 1 is located.

In the light guide structure provided by embodiments of the present disclosure, with the cooperation between the reflection type brightness enhancement film 2 and the quarter wavelength plate 3, exiting light (light exiting from the light guide plate) that does not coincide with the transmission axis of the reflection type brightness enhancement film 2 is reflected by the reflection type brightness enhancement film 2, and then passes through the quarter wavelength plate 3 and is converted into left-handed circularly polarized light and enters the light guide plate 1 and then reaches the reflection film 4, and then is reflected by the reflection film 4 and converted into right-handed circularly polarized light and returns to the light guide plate 1, and then passes through the quarter wavelength plate 3 and is converted into linearly polarized light that coincides with the transmission axis of the reflection type brightness enhancement film 2, and then passes through the reflection type brightness enhancement film 2; therefore, losses of light in travelling are reduced, and utilization rate of light is increased.

For example, the light guide structure can further include a lower polarizer 5 disposed above the reflection type brightness enhancement film 2, and the transmission axis of the lower polarizer 5 is parallel to the transmission axis of the reflection type brightness enhancement film 2. In the present embodiment, the transmission axis of the lower polarizer 5 coincides with the transmission axis of the reflection type brightness enhancement film 2, and linearly polarized light transmitted through the reflection type brightness enhancement film 2 can similarly transmit through the lower polarizer 5.

Figure 2:
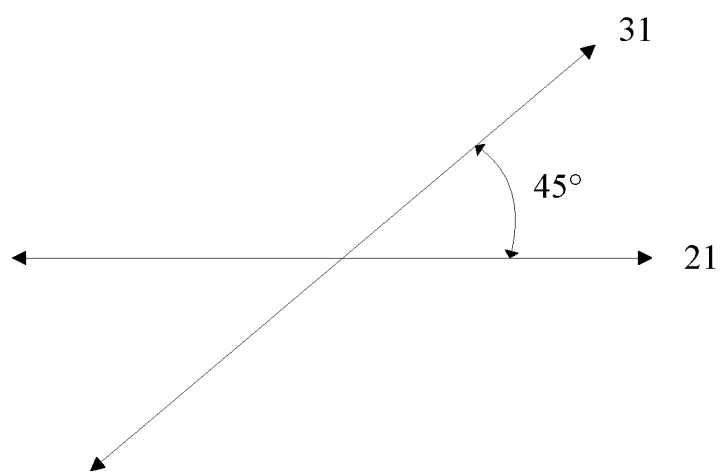
FIG. 2 is a schematic diagram illustrating an angle between a slow axis of a quarter wavelength plate and a transmission axis of a reflection type brightness enhancement film provided by an embodiment of the disclosure.

FIG. 2 is a schematic diagram illustrating an angle formed between a transmission axis 21 of the reflection type brightness enhancement film 2 and a slow axis 31 of the quarter wavelength plate 3; for example, the transmission axis 21 of the reflection type brightness enhancement film 2 and the slow axis 31 of the quarter wavelength plate 3 form an angle of 45 degree. Correspondingly, the transmission axis of the lower polarizer 5 is parallel to the transmission axis 21 of the reflection type brightness enhancement film 2 (not shown).

For example, the lower polarizer 5 is an absorption type polarizer. The lower polarizer 5 can absorb light with a transmission axis that does not coincide with the transmission axis of the lower polarizer.

For example, the light guide plate 1 can be made of various isotropic materials. The light guide plate can be made of such as glass or hard polymethyl methacrylate (organic glass).

For example, the light guide plate 1 is a glass light guide plate. The light guide plate 1 can be thinned favorably by adopting a glass plate with higher hardness and lower coefficient of thermal expansion, and glass is an isotropic material, light transmitted in which will not change its polarization direction.

For example, the light guide plate 1 is a hard polymethyl methacrylate light guide plate. The hard polymethyl methacrylate light guide plate is of an isotropic material, light transmitted in which will not change its polarization direction.

For example, the reflection film 4 is an enhancement mirror reflection film. For example, a thickness of the reflection film 4 is in a range of 2 μm-5 μm.

In the light guide structure provided by the above-mentioned embodiments of the present disclosure, with the cooperation of the reflection type brightness enhancement film and the quarter wavelength plate, exiting light (light exiting from the light guide plate) that does not coincide with the transmission axis of the reflection type brightness enhancement film is reflected by the reflection type brightness enhancement film, and then passes through the quarter wavelength plate and is converted into left-handed circularly polarized light and enters the light guide plate 1, and then is reflected by the reflection film and converted into right-handed circularly polarized light and enters the light guide plate, and then is converted into linearly polarized light that coincides with the transmission axis of the reflection type brightness enhancement film by the quarter wavelength plate, and then passes through the reflection type brightness enhancement film, therefore, losses of light in travelling are reduced, and utilization rate of light is increased.

Figure 3:
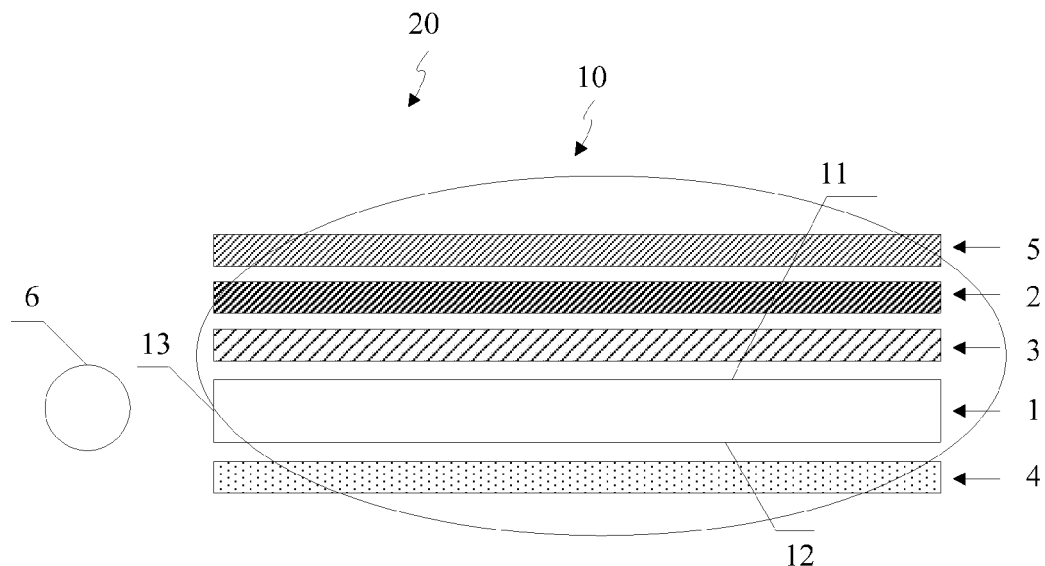
FIG. 3 is a schematic diagram illustrating a light guide module provided by an embodiment of the disclosure.

Referring to FIG. 3, embodiments of the present disclosure further provide a backlight module 20 including any one of the above-mentioned light guide structure 10, and further including a light source 6; the light source 6 is disposed at the side surface 13 of the light guide plate 1.

In the backlight module provided by embodiments of the present disclosure, the light guide structure of the backlight module has the reflection type brightness enhancement film cooperate with the quarter wavelength plate, exiting light (light exiting from the light guide plate) that does not coincide with the transmission axis of the reflection type brightness enhancement film is reflected by the reflection type brightness enhancement film, and then passes through the quarter wavelength plate and is converted into left-handed circularly polarized light and enters the light guide plate, and then is reflected by the reflection film and converted into right-handed circularly polarized light and enters the light guide plate, and then is converted into linearly polarized light that coincides with the transmission axis of the reflection type brightness enhancement film by the quarter wavelength plate, and then passes through the reflection type brightness enhancement film, therefore, losses of light in travelling are reduced, and utilization rate of light is increased.

Figure 4:
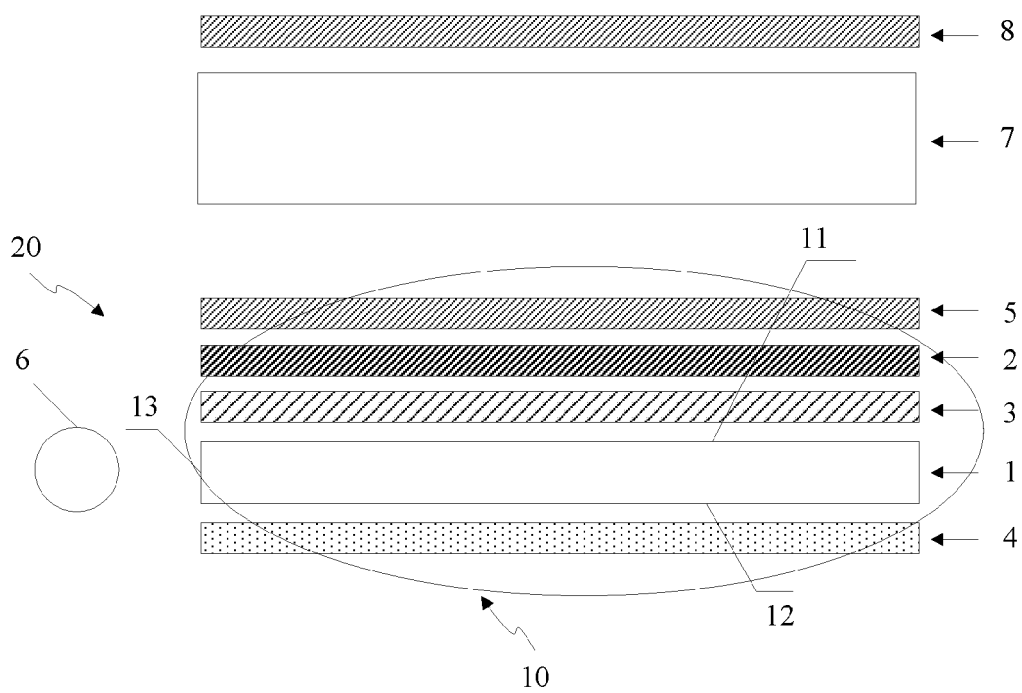
FIG. 4 is a schematic diagram illustrating a display device provided by an embodiment of the disclosure.

Referring to FIG. 4, embodiments of the present disclosure further provide a display device including a display panel 7 and any one of the above-mentioned backlight module 20, and the backlight module 20 is disposed at a non-display side of the display panel 7.

For example, the display device further includes an upper polarizer 8, the upper polarizer 8 is disposed at a display side of the display panel 7, and a transmission axis of the upper polarizer 8 is parallel or perpendicular to a transmission axis of the lower polarizer 5 of the light guide structure 10.

In the display device provided by embodiments of the present disclosure, the light guide structure of the backlight module has the reflection type brightness enhancement film cooperate with the quarter wavelength plate, exiting light (light exiting from the light guide plate) that does not coincide with the transmission axis of the reflection type brightness enhancement film is reflected by the reflection type brightness enhancement film, and then passes through the quarter wavelength plate and is converted into left-handed circularly polarized light and enters the light guide plate, and then is reflected by the reflection film and converted into right-handed circularly polarized light and enters the light guide plate, and then is converted into linearly polarized light that coincides with the transmission axis of the reflection type brightness enhancement film by the quarter wavelength plate, and then passes through the reflection type brightness enhancement film, therefore, losses of light in travelling are reduced, and utilization rate of light is increased.

What are described above is used to illustrate the embodiments of the disclosure only and is not limitative to it. Although the disclosure of the application is described in connection with the above embodiments, those skilled in the art should understand that, the technical schemes described in above embodiments can be modified, or part of features thereof can be substituted, and these modification or substitution would not render the technical schemes depart from the spirit and scope of the embodiments of the disclosure.

This application claims the benefit of priority from Chinese patent application No. 201510346533.X, filed on Jun. 19, 2015, the disclosure of which is incorporated herein in its entirety by reference as a part of the present application.

What is claimed is:

1. A light guide structure comprising:
a light guide plate, comprising a light-exiting surface and a reflection surface that are opposite to each other and a side surface connecting the light-exiting surface with the reflection surface, and a material of the light guide plate being an isotropic material;
a reflection type brightness enhancement film, being disposed at a side where the light-exiting surface of the light guide plate is located;
a quarter wavelength plate, being disposed between the light-exiting surface of the light guide plate and the reflection type brightness enhancement film, with an angle of 45 degrees existing between a slow axis of the quarter wavelength plate and a transmission axis of the reflection type brightness enhancement film; and
a reflection film, being disposed at a side where the reflection surface of the light guide plate is located.

2. The light guide structure according to claim 1, further comprising a lower polarizer disposed above the reflection type brightness enhancement film, wherein a transmission axis of the lower polarizer is parallel to the transmission axis of the reflection type brightness enhancement film.

3. The light guide structure according to claim 2, wherein the lower polarizer is an absorption type polarizer.

4. The light guide structure according to claim 3, wherein the light guide plate is a glass light guide plate or a light guide plate of hard polymethyl methacrylate.

5. The light guide structure according to claim 3, wherein the reflection film is an enhancement mirror reflection film.

6. The light guide structure according to claim 3, wherein a thickness of the reflection film is in a range of 2 µm-5 µm.

7. The backlight module comprising the light guide structure according to claim 3 and a light source, wherein the light source is disposed at the side surface of the light guide plate.

8. The light guide structure according to claim 2, wherein the light guide plate is a glass light guide plate or a light guide plate of hard polymethyl methacrylate.

9. The light guide structure according to claim 2, wherein the reflection film is an enhancement mirror reflection film.

10. The light guide structure according to claim 2, wherein a thickness of the reflection film is in a range of 2 µm-5 µm.

11. The backlight module comprising the light guide structure according to claim 2 and a light source, wherein the light source is disposed at the side surface of the light guide plate.

12. The light guide structure according to claim 1, wherein the light guide plate is a glass light guide plate or a light guide plate of hard polymethyl methacrylate.

13. The light guide structure according to claim 12, wherein the reflection film is an enhancement mirror reflection film.

14. The light guide structure according to claim 12, wherein a thickness of the reflection film is in a range of 2 µm-5 µm.

15. The backlight module comprising the light guide structure according to claim 12 and a light source, wherein the light source is disposed at the side surface of the light guide plate.

16. The light guide structure according to claim 1, wherein the reflection film is an enhancement mirror reflection film.

17. The light guide structure according to claim 1, wherein a thickness of the reflection film is in a range of 2 µm-5 µm.

18. The backlight module comprising the light guide structure according to claim 1 and a light source, wherein the light source is disposed at the side surface of the light guide plate.

19. The display device comprising a display panel and the backlight module according to claim 18, wherein the backlight module is disposed at a non-display side of the display panel.

20. The display device according to claim 19, further comprising an upper polarizer, wherein the upper polarizer is disposed at a display side of the display panel, and a transmission axis of the upper polarizer is parallel or perpendicular to the transmission axis of the reflection type brightness enhancement film.

* * * * *